United States Patent
Liao et al.

(10) Patent No.: US 7,921,126 B2
(45) Date of Patent: Apr. 5, 2011

(54) PATENT SUMMARIZATION SYSTEMS AND METHODS

(75) Inventors: Chia-Hsin Liao, Zhonghe (TW); I-Heng Meng, Hsinchu (TW); Lu-Ping Chang, Hsinchu (TW)

(73) Assignee: Institute of Information Industry, Daan Chiu, Taipei (TW)

( * ) Notice: Subject to any disclaimer, the term of this patent is extended or adjusted under 35 U.S.C. 154(b) by 1867 days.

(21) Appl. No.: 11/020,748

(22) Filed: Dec. 23, 2004

(65) Prior Publication Data
US 2006/0074856 A1    Apr. 6, 2006

(30) Foreign Application Priority Data

Oct. 1, 2004  (TW) .............................. 93129790 A

(51) Int. Cl.
*G06F 17/00* (2006.01)
(52) U.S. Cl. .................. 707/755; 707/999.006; 707/809
(58) Field of Classification Search .................. None
See application file for complete search history.

(56) References Cited

U.S. PATENT DOCUMENTS

| | | | | |
|---|---|---|---|---|
| 6,038,561 A * | 3/2000 | Snyder et al. | ..................... | 707/6 |
| 2001/0014852 A1 * | 8/2001 | Tsourikov et al. | ................. | 704/9 |
| 2006/0069546 A1 * | 3/2006 | Rosser et al. | ..................... | 704/9 |
| 2006/0074836 A1 * | 4/2006 | Gardner et al. | ................. | 706/60 |
| 2006/0217818 A1 * | 9/2006 | Fujiwara | ........................ | 700/16 |

* cited by examiner

*Primary Examiner* — Belix M Ortiz
(74) *Attorney, Agent, or Firm* — Thomas | Kayden

(57) ABSTRACT

Methods for patent summarization are disclosed. A digital file comprising an issued patent document or a published application is acquired. At least one claim string is acquired from the digital file. Multiple elements are acquired from the claim string. A part-of relationship architecture among a portion of the elements is generated according to the claim string. At least one is-a relationship for at least one of the elements is generated according to the claim string. At least one association relationship for at least one of the elements is generated according to the claim string. The part-of relationship architecture, as-is relationship and association relationship are displayed.

10 Claims, 12 Drawing Sheets

PATENT SUMMARIZATION SYSTEMS AND METHODS

BACKGROUND

The invention relates to document summarization technology, and more particularly, to systems and methods of patent summarization.

A patent is a document issued by the U.S. government or other government which describes and claims an invention, and grants to the patent owner a legal right to exclude all others from practicing the invention within the jurisdiction of that government. A patent consists of abstract, specification, claims (which conclude the specification), and drawings, if necessary. The abstract describes a brief statement on the front page of the patent, briefly describing the invention. The specification is a description of the manner and process of making and using the invention, including the "preferred embodiment" of the invention, sufficient to enable a person of ordinary skill in that technology to practice the invention. The claims are a list of statements which distinctly and particularly point out the subject matter which the applicant regards as the invention, thereby legally defining the boundaries of the patent rights. The drawings include block diagrams, flowcharts, schematics and the like, which illustrate the invention.

Hard patent documents may be digitalized by scanners with relevant Optical Character Recognition (OCR) equipment, or a digital file maybe provided by applicants, providing capability for analysis by various mathematical methods. Patent documents, however, are usually difficult to understand and need to be summarized.

SUMMARY

Patent summarization methods are provided. An exemplary method is disclosed. A digital file comprising an issued patent document or a published application is acquired. At least one claim string is acquired from the digital file. Multiple elements are acquired from the claim string. A part-of relationship architecture among a portion of the elements is generated according to the claim string. At least one is-a relationship for at least one of the elements is generated according to the claim string. At least one association relationship for at least one of the elements is generated according to the claim string. The part-of relationship architecture, as-is relationship and association relationship are displayed.

Another exemplary method is also disclosed. An exemplary method is disclosed. A digital file comprising an issued patent document or a published application is acquired. At least one claim string is acquired from the digital file. A first substring in the claim string between an indefinite article or a quantifier and a punctuation mark is acquired. A second substring in the claim string between a definite article and a punctuation mark is acquired. Maximum matching substrings from the beginning between one of the first substrings and one of the second substrings are acquired as elements. The acquired elements are displayed.

A machine-readable storage medium storing a computer program which, when executed, performs the method of patent summarization is also disclosed.

BRIEF DESCRIPTION OF THE DRAWINGS

Patent summarization systems and methods will become apparent by referring to the following detailed description of embodiments with reference to the accompanying drawings, wherein.

DESCRIPTION

Figure 1:
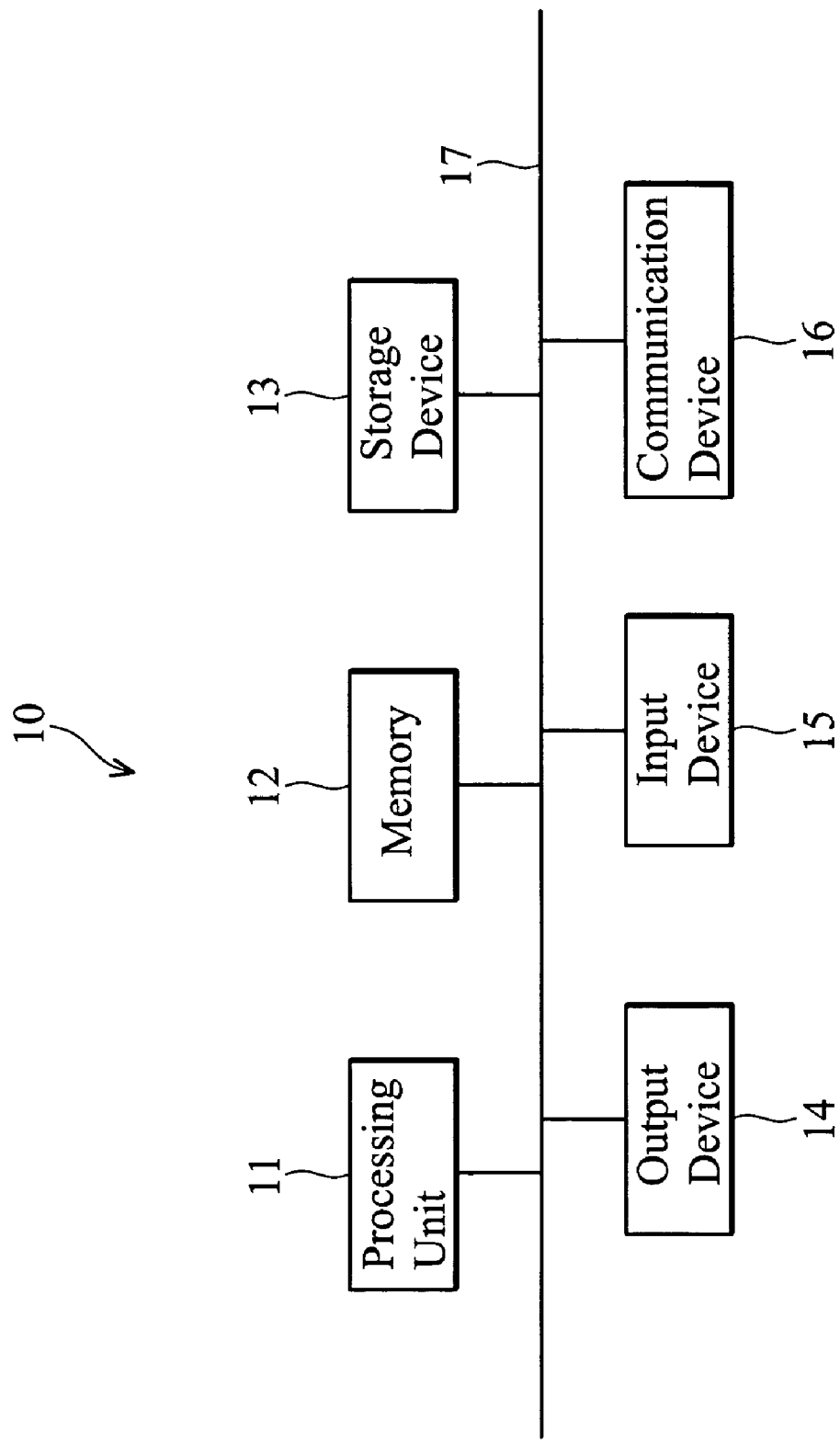
FIG. 1 is a diagram of a hardware environment applicable to an embodiment of a patent summarization system.

FIG. 1 is a diagram of a hardware environment applicable to an embodiment of a patent summarization system, comprising a processing unit 11, a memory 12, a storage device 13, an input device 14, an output device 15 and a communication device 16. The processing unit 11 is connected by buses 17 to the memory 12, storage device 13, input device 14, output device 15 and communication device 16 based on Von Neumann architecture. There may be one or more processing units 11, such that the processor of the computer comprises a single central processing unit (CPU), a micro processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform Web link management functions. Generally, program modules include routines, programs, objects, components, scripts, Web pages, or others, that perform particular tasks or implement particular abstract data types. Moreover, those skilled in the art will understand that some embodiments may be practiced with other computer system configurations, including hand-held devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, portable drive, or nonvolatile memory drive. The drives and associated computer-readable media thereof (if required) provide nonvolatile storage of computer-readable instructions, data structures and program modules. The processing unit 11, controlled by program modules received from the memory 12 and from an operator through the input device, directs patent summarization functions.

Figure 2:
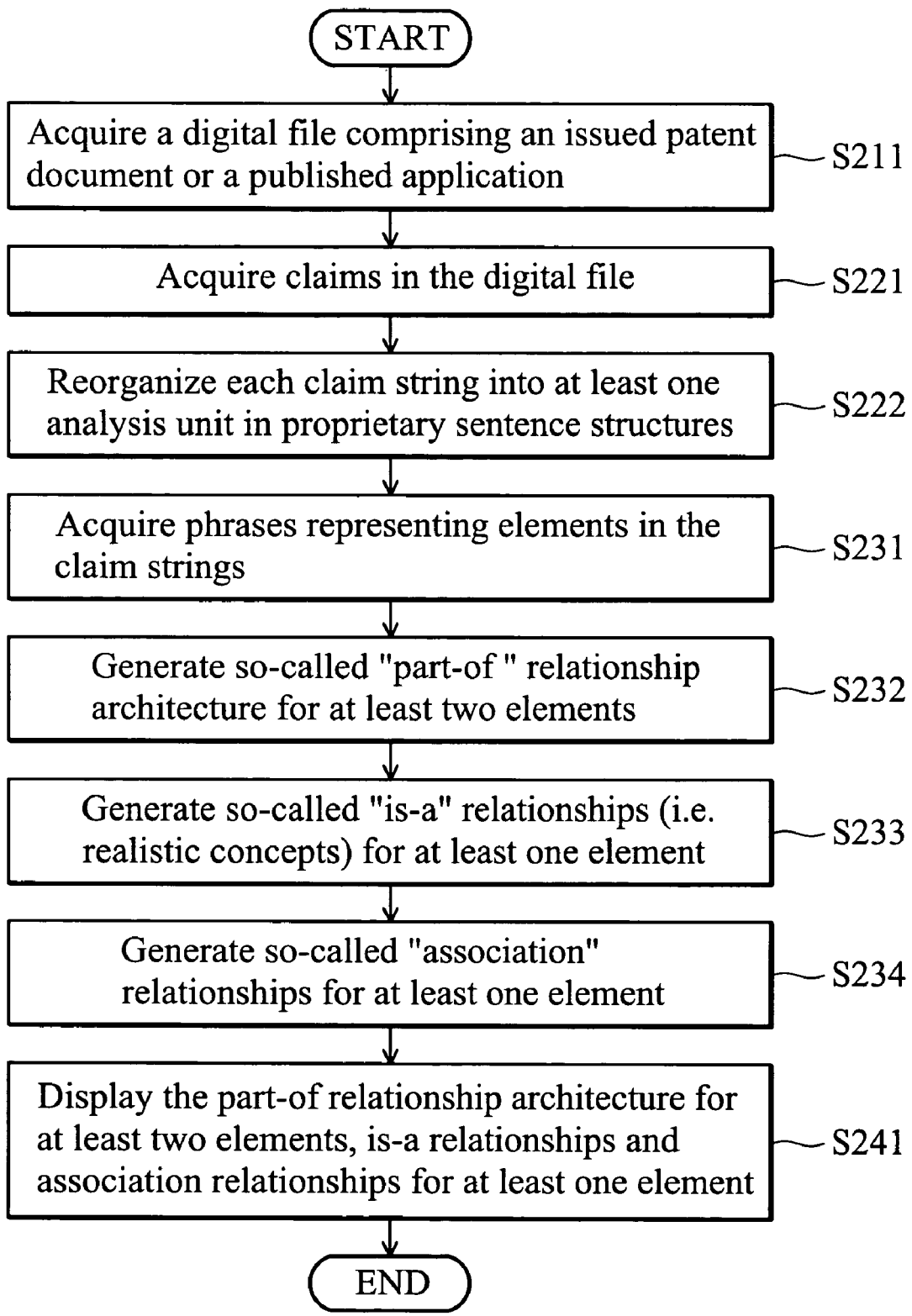
FIG. 2 is a flowchart showing an embodiment of a method for patent summarization.

FIG. 2 is a flowchart showing an embodiment of a method for patent summarization. In step S211, a digital file comprising an issued patent document or a published application is acquired.

In step S221, claims in the digital file are acquired and clustered in at least one group individually comprising an independent claim and dependent claims thereto. For example, the claim acquisition may detect a claim heading, such as "Claims" or others, and a specification heading, such as "Description" or others, and subsequently acquire content between the detected claim heading and specification heading. Each claim in the acquired content is recognized as an independent claim or a dependent claim by detecting particular sentence patterns for independent claims, such as "A s1 for s2", "A s1 of s2", "A s1 comprising:" or others, where s1 and s2 represent variable length strings, and for dependent claims, such as "s1 as described in claim n1", "s1 as claimed in claim n1", "s1 of claim n1" or others, where s1 represents the variable length string and n1 represents the dependency thereto. These sentence patterns may be stored in files, database tables or data objects in various formats with specific data structures. Each claim is accordingly marked with a claim type, such as independent claim, dependent claim depending from independent claim or dependent claim depending from dependent claim n1, where n1 represents a claim number. The claim strings can finally be clustered into at least one group according to these claim types.

In step S222, each claim string is reorganized into at least one analysis unit in proprietary sentence structure, such as "Subject-Action-Object, SAO", "Subject-Action-Indirect Object-Direct Object, SAOiOd" or other structures in active voice. It may use well-known various part-of-speech algorithms with relevant dictionaries or thesauruses, and/or various lexical analysis algorithms to identity nouns, verbs, noun phrases, adjectives, adverbs, or others, and accordingly reorganize the sentence using predetermined grammar rules. The SAO and SAOiOd structure conversions are well-known in the art, and only described briefly herein.

Figure 3A:
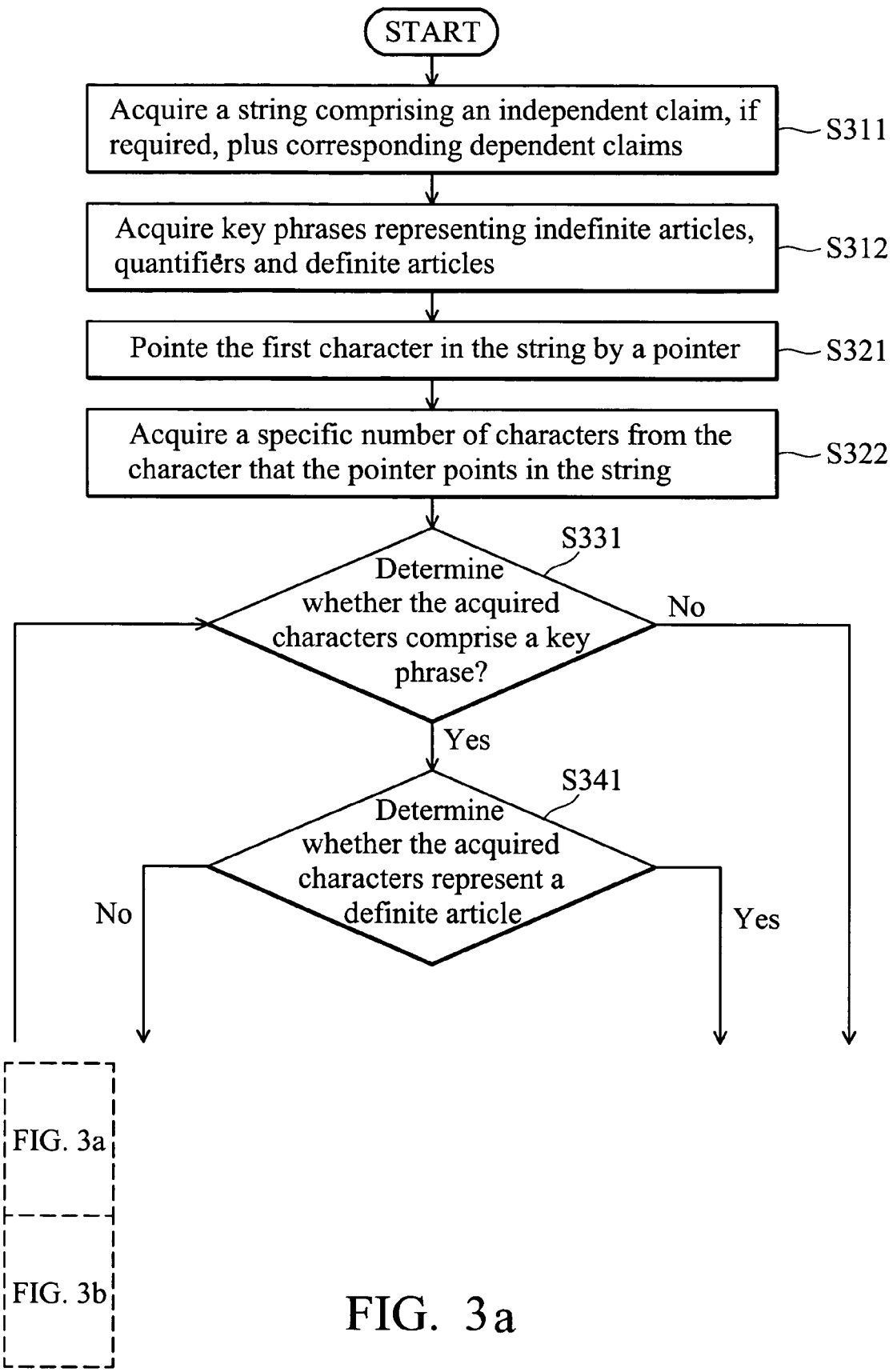
FIG. 3 is a flowchart showing an embodiment of a process for element acquisition.
Figure 3B:
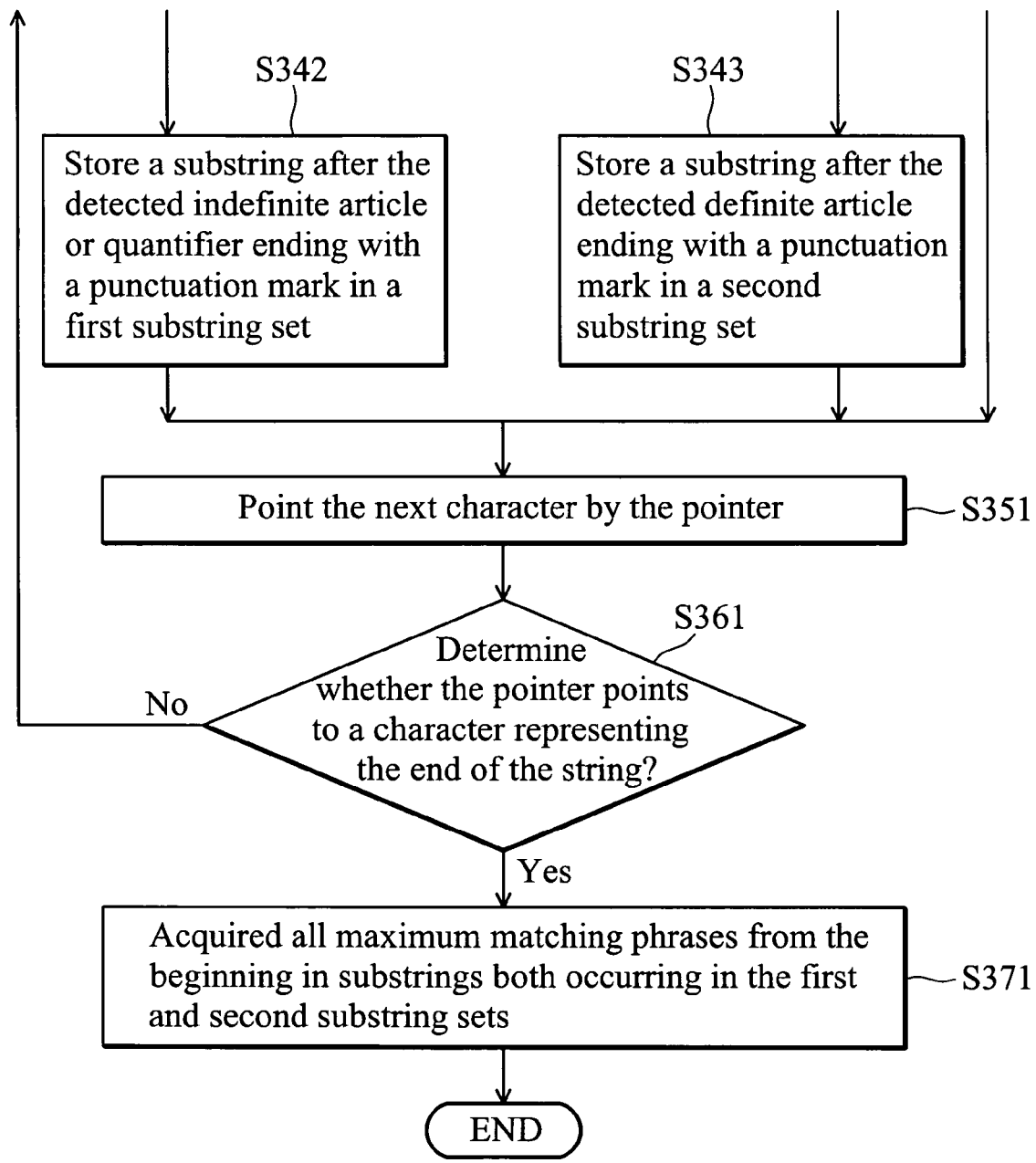

In step S231, phrases representing elements in the claim strings are acquired. The acquisition of element phrase is acquired by detecting the longest matching strings in the string after all indefinite articles, such as "a", "an" and the like, quantifiers, such as "a plurality of", "each", "every", "all", "only one", "two", "at least one", "one or more" and the like, and definite articles, such as "the", "said" and the like. Details of the process are further illustrated in FIGS. 3a and 3b to acquire phrases representing elements. In step S311, a string comprising an independent claim, if required, plus corresponding dependent claims, is acquired. Those skilled in the art will appreciate that all control symbols, such as line feeds, tab signals and the like, are removed from the string. In step S312, key phrases representing indefinite articles, quantifiers and definite articles are acquired. In step S321, the first character in the string is pointed by a pointer. In step S322, a specific number of characters in the string are acquired from the character that the pointer points, preferably the number equaling the maximum character number among the acquired key phrases. In step S331, it is determined whether the acquired characters comprise a key phrase, and, if so, the process proceeds to step S341, and otherwise, the process proceeds to step S351. In step S341, it is determined whether the acquired characters represent a definite article, and, if so, the process proceeds to step 343, and otherwise, the process proceeds to step S342. In step S342, a substring after the detected indefinite article or quantifier ending with a punctuation mark is stored in a first substring set. In step S343, a substring after the detected definite article ending with a punctuation mark is stored in a second substring set. In step S351, the next character is pointed by the pointer. In step S361, it is determined whether the pointer points to a character representing the end of the string, and, if so, the process proceeds to step S371, and otherwise, the process proceeds to step S322. In step S371, all maximum matching phrases from the beginning in substrings both occurring in the first and second substring sets are acquired and subsequently stored in the memory 12 or the storage device 13.

Details of the method for acquisition of element phrases are illustrated in the following example. In step S311, a string "A client computer including: a service manager object loaded into the client computer for managing services called by a browser script received in the scripting space of a browser of the client computer; and at least one service loaded into the client computer in communication with a service manager, said service manager being programmed to handle service requests received from scripting spaces of Web pages via a connector object wherein the client computer maintains service-related information in memory as one or more additional Web pages are received by the client computer." is acquired. After repeatedly performing steps S321 to S361, substrings "client computer including", "service manager object loaded into the client computer for managing services called by a browser script received in the scripting space of a browser of the client computer", "browser script received in the scripting space of a browser of the client computer", "browser of the client computer", "service loaded into the client computer in communication with the service manager", "service manager", "connector object wherein the client computer maintains service-related information in memory as one or more additional Web pages are received by the client computer" and "additional Web pages are received by the client computer" are stored in the first substring set, and substrings "client computer for managing services called by a browser script received in the scripting space of a browser of the client computer", "client computer in communication with a service manager", "service manager being programmed to handle service requests received from scripting spaces of Web pages via a connector object wherein the client computer maintains service-related information in memory as one or more additional Web pages are received by the client computer", "client computer" are stored in the second substring set. In step S371, phrases "client computer" and "service manager" are acquired as elements.

Figure 4A:
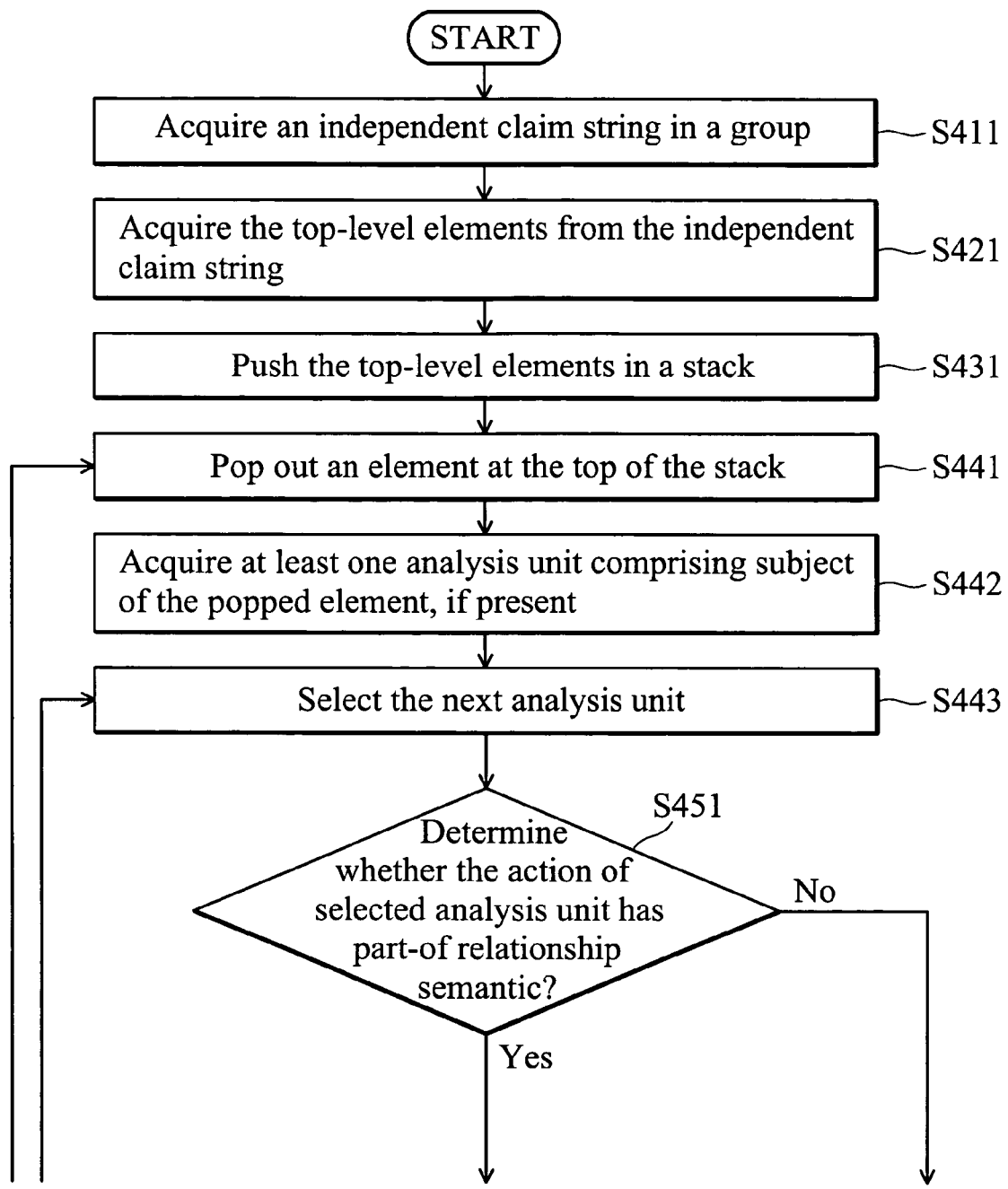
FIG. 4 is a flowchart showing an embodiment of a process for generation of a part-of relationship architecture.
Figure 4B:
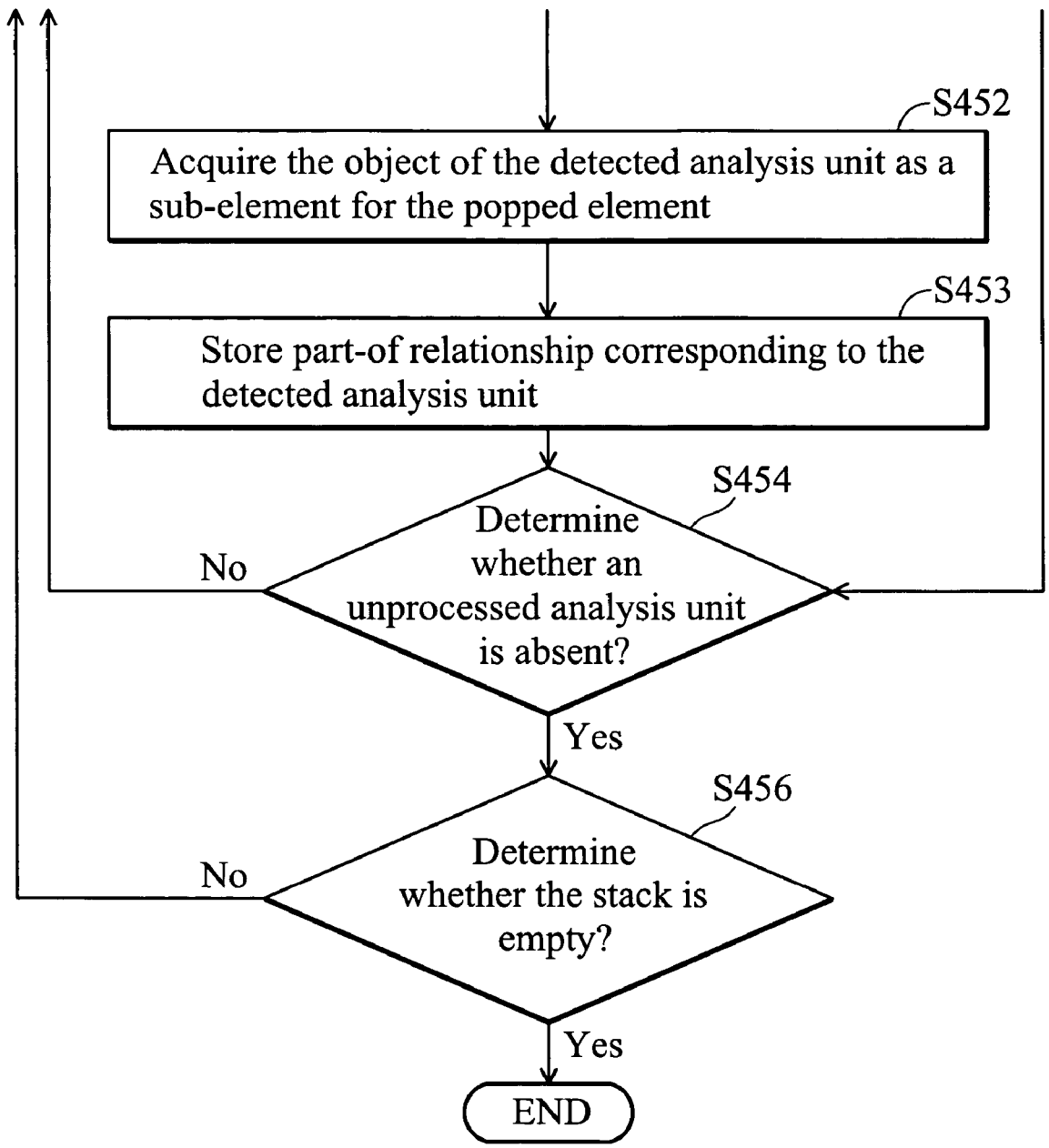

In step S232 of FIG. 2, so-called "part-of" relationship architecture for at least two elements is generated. The part-of relationship architecture is generated by acquiring top-level elements in the independent claim, and then recursively acquiring sub-components for each top-level element and new acquired sub-components. Details of an exemplary process are further illustrated in FIGS. 4a and 4b. In step S411, an independent claim string in a group is acquired. In step S421, the top-level elements are acquired from the independent claim string. In some embodiments, the top-level elements of claimed subject matter are acquired by identifying substrings after punctuation mark ":" or ";", or phrase ";and" containing one of the composition component phrases acquired in step S231 of FIG. 2. In step S431, the top-level elements are pushed in a stack. In step S441, an element at the top of the stack is popped out. In step S442, if present, at least one analysis unit generated in step S222 of FIG. 2, comprising subject of the popped element is acquired. In step S443, the next analysis unit is selected. In step S451, it is determined whether the action of selected analysis unit has part-of relationship semantic, and, if so, the process proceeds to step S452, and otherwise, the process proceeds to step S455. In some embodiments, it is determined whether the action of analysis unit comprises part-of relationship keywords, such as "include", "comprise", "contain", and the like. In step S452, the object of the detected analysis unit is acquired as a sub-element for the popped element. In step S453, part-of relationship corresponding to the detected analysis unit is stored in the memory 12 or the storage device 13. Note that the part-of relationship architecture may be implemented in a tree structure, queue, data table or similar data structures. In step S454, the detected sub-elements are pushed in the stack. In step S455, it is determined whether an unprocessed analysis unit is absent, and, if so, the process proceeds to step S456, and otherwise, the process proceeds to step S443. In step S456, it is determined whether the stack is empty, and, if so, the entire process ends, and otherwise, the process proceeds to S441. Although the exemplary process employs a stack to acquire part-of relationship architecture, those skilled in the art will realize that any data structure supporting "First-in-last-out" feature is also available.

Figure 5:
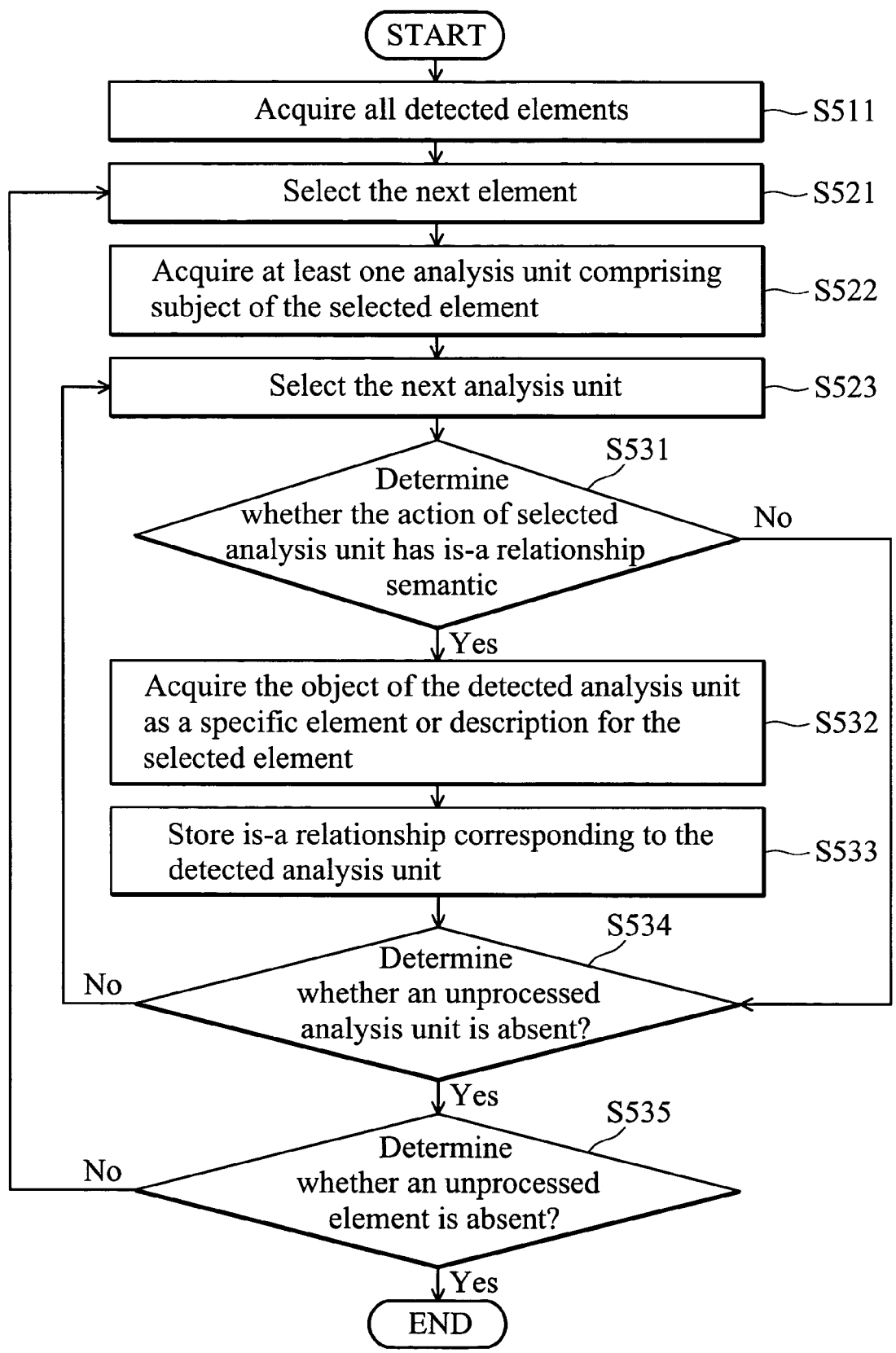
FIG. 5 is a flowchart showing an embodiment of a process for generation of a is-a relationship architecture.

In step S233 of FIG. 2, so-called "is-a" relationships (i.e. realistic concepts) for at least one element are generated. Details of an exemplary process are further illustrated in FIG. 5. In step S511, elements acquired in step S231 are acquired. In step S521, the next element is selected. In step S522, at least one analysis unit generated in step S222 of FIG. 2, comprising subject of the selected element is acquired. In step S523, the next analysis unit is selected. In step S531, it is determined whether the action of selected analysis unit has is-a relationship semantic, and, if so, the process proceeds to step S532, and otherwise, the process proceeds to step S534. In some embodiments, it is determined whether the action of analysis unit comprises is-a relationship keywords, such as "is", "are", "represent", "indicate", and the like. In step S532, the object of the detected analysis unit is acquired as a specific element or description for the selected element. In step S533, is-a relationship corresponding to the detected analysis unit is stored in the memory 12 or the storage device 13. Note that the is-a relationship architecture may be implemented in a tree structure, queue, data table or similar data structures. In step S534, it is determined whether an unprocessed analysis unit is absent, and, if so, the process proceeds to step S535, and otherwise, the process proceeds to step S523. In step S535, it is determined whether an unprocessed element is absent, and, if so, the entire process ends, and otherwise, the process proceeds to S523.

Figure 6:
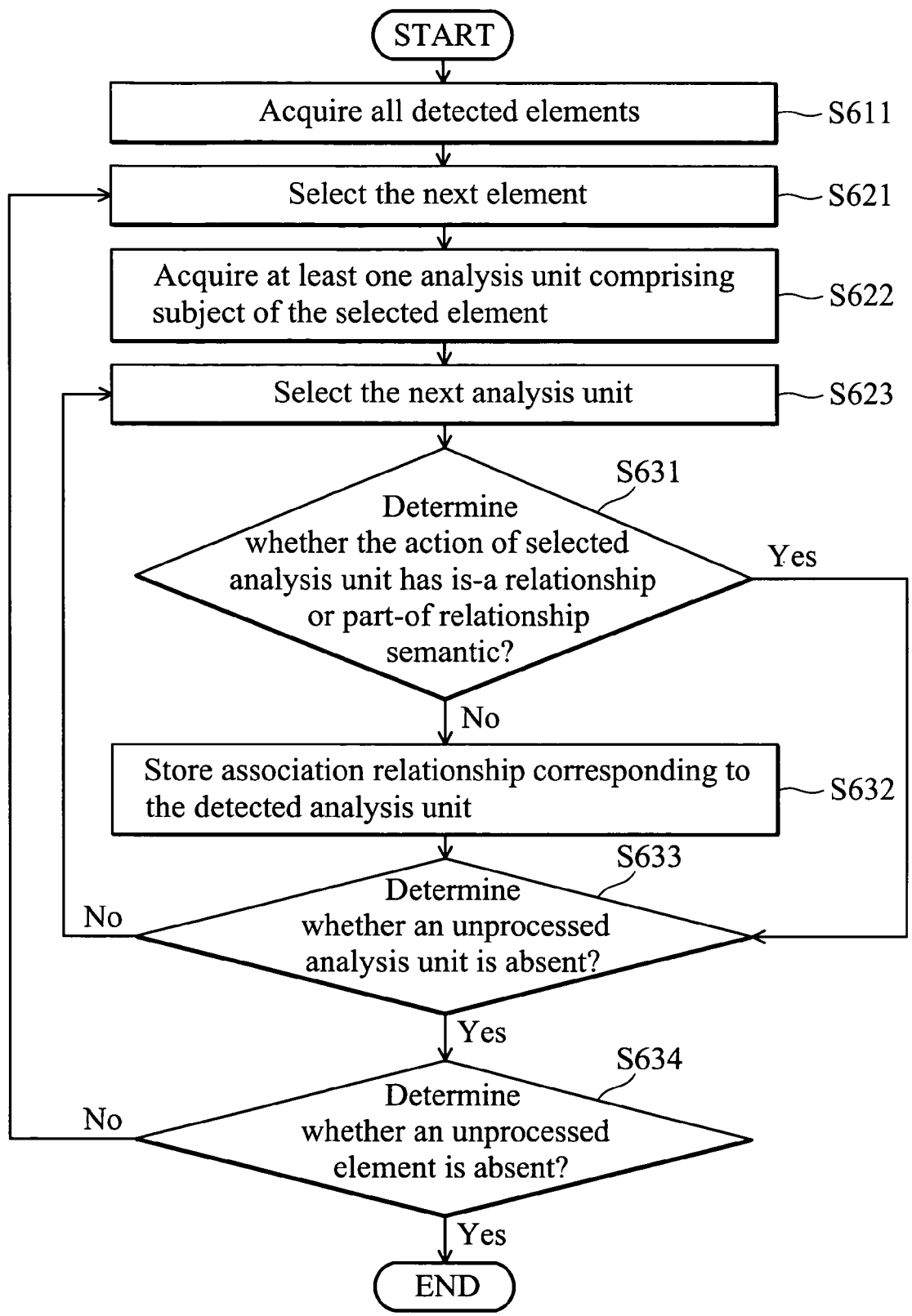
FIG. 6 is a flowchart showing an embodiment of a process for generation of an association relationship architecture.

In step S234 of FIG. 2, so-called "association" relationships for at least one element are generated. Details of an exemplary process are further illustrated in FIG. 6. In step S611, elements acquired in step S231 are acquired. In step S621, the next element is selected. In step S622, at least one analysis unit generated in step S222 of FIG. 2, comprising subject of the selected element is acquired. In step S623, the next analysis unit is selected. In step S631, it is determined whether the action of selected analysis unit has is-a relationship or part-of relationship semantics, and, if not, the process proceeds to step S632, and otherwise, the process proceeds to step S633. In step S632, association relationship corresponding to the detected analysis unit is stored in the memory 12 or the storage device 13. Note that the association relationship architecture may be implemented in a tree structure, queue, data table or similar data structures. In step S633, it is determined whether an unprocessed analysis unit is absent, and, if so, the process proceeds to step S634, and otherwise, the process proceeds to step S623. In step S634, it is determined whether an unprocessed element is absent, and, if so, ends the entire process, and otherwise, the process proceeds to S621.

Figure 7:
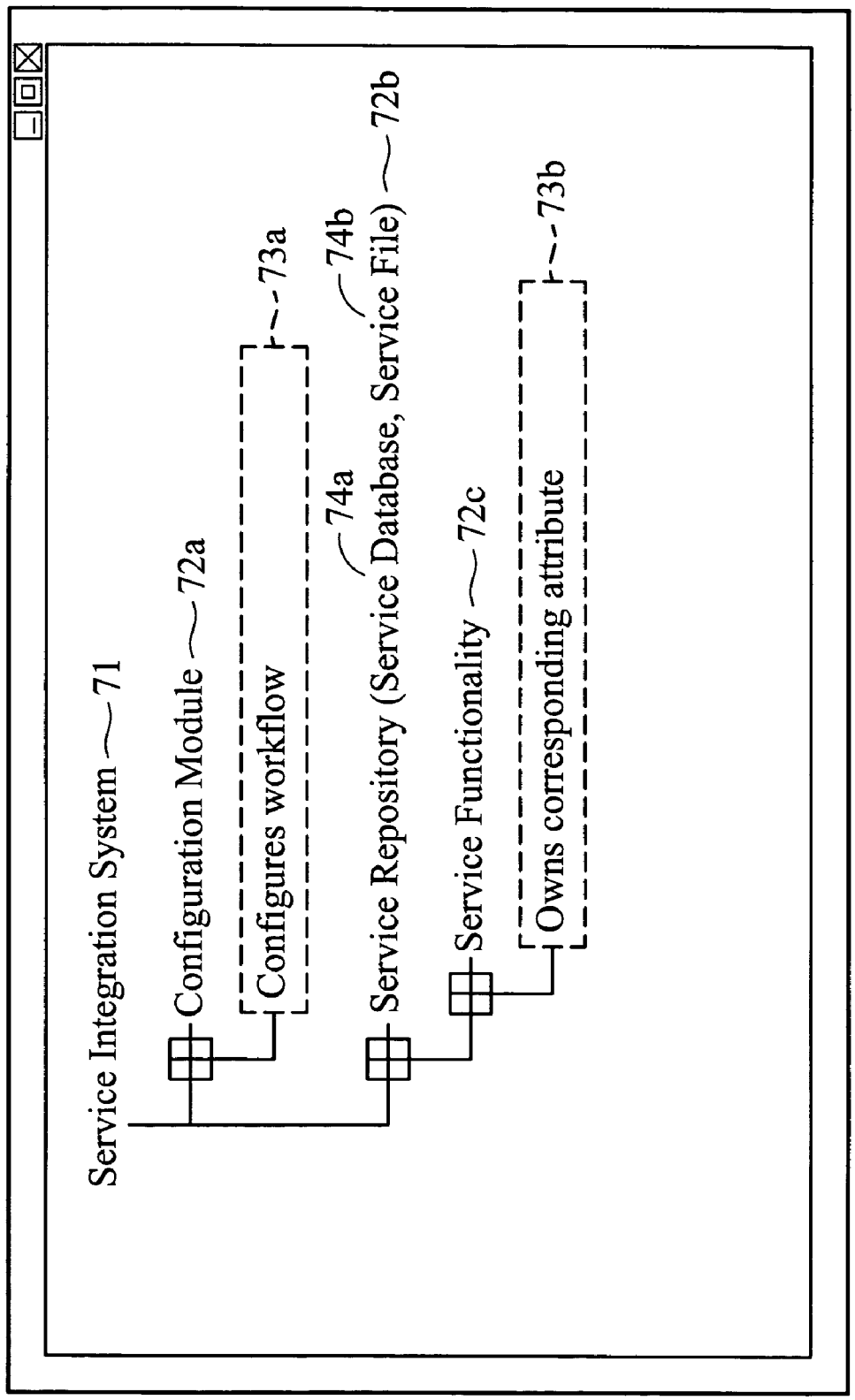
FIG. 7 is an exemplary screen diagram showing a tree structure for patent claim summarization.
Figure 8:
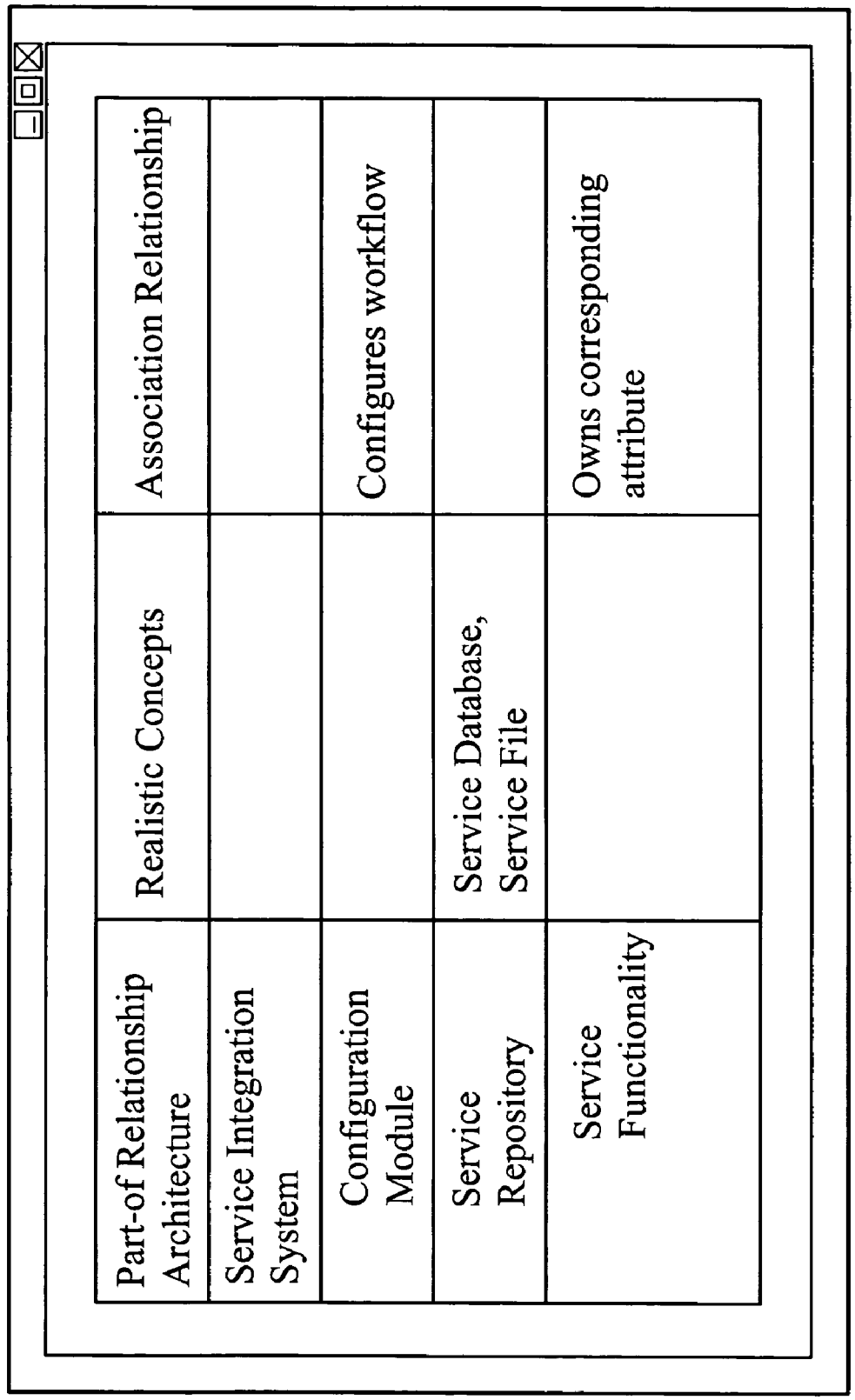
FIG. 8 is an exemplary screen diagram showing a data table for patent claim summarization.
Figure 9:
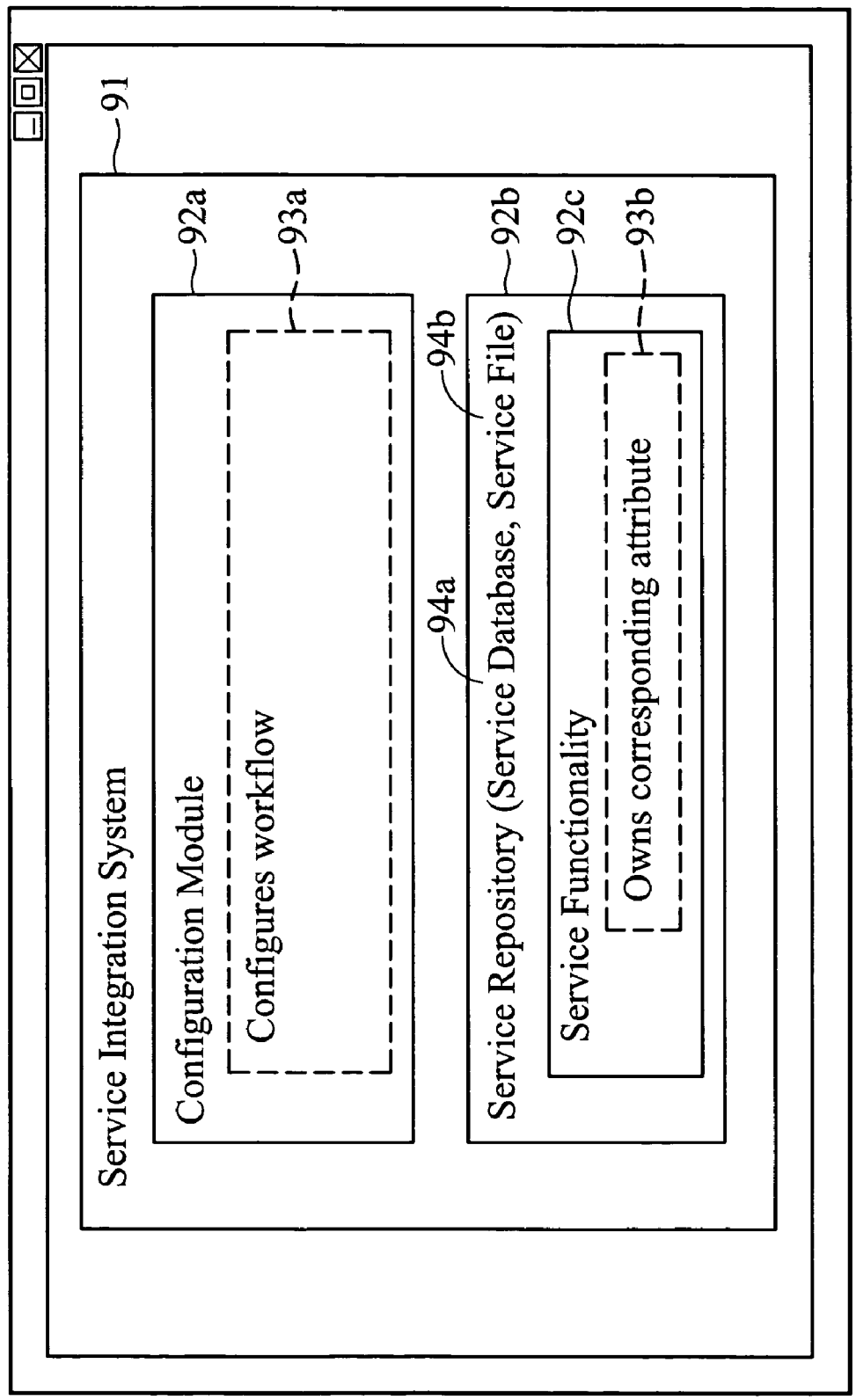
FIG. 9 is an exemplary screen diagram showing a block diagram for patent claim summarization.

In step S241 of FIG. 2, the part-of relationship architecture for at least two elements, is-a relationships and association relationships for each element are displayed via the output device 14. Several exemplary screen diagrams are provided. FIG. 7 is an exemplary screen diagram showing a tree structure for patent claim summarization. A root node 71 comprises a subject matter. Branch nodes 72a, 72b and 72c illustrate a part-of relationship architecture. The branch node 72b also comprises realistic concepts 74a and 74b (bracketed in quotation marks) for an element displayed in the branch node 72b. Leaf nodes 73a and 73b respectively comprise association relationships for elements displayed in the branch nodes 72a and 72c. Note that the realistic concepts 74a and 74b may not be directly displayed in the branch node 72b, but displayed in a pop-up window or bubble window when a cursor moves on the branch node 72b. FIG. 8 is an exemplary screen diagram showing a data table for patent claim summarization. Field 81 shows a part-of relationship architecture for elements, field 82 shows realistic concepts for elements, and field 83 shows association relationships for elements. FIG. 9 is an exemplary screen diagram showing a block diagram for patent claim summarization. Blocks 91, 92a, 92b and 92c illustrate a part-of relationship architecture. The block 92b also comprises realistic concepts 94a and 94b (bracketed in quotation marks) for an element displayed in the block 92b. The block 93a and 93b respectively comprise association relationships for elements displayed in the blocks 92a and 92c. Note that the realistic concepts 94a and 94b may not be directly displayed in the block 92b, but displayed in a pop-up window or bubble window when a cursor moves on the block 92b.

Figure 10:
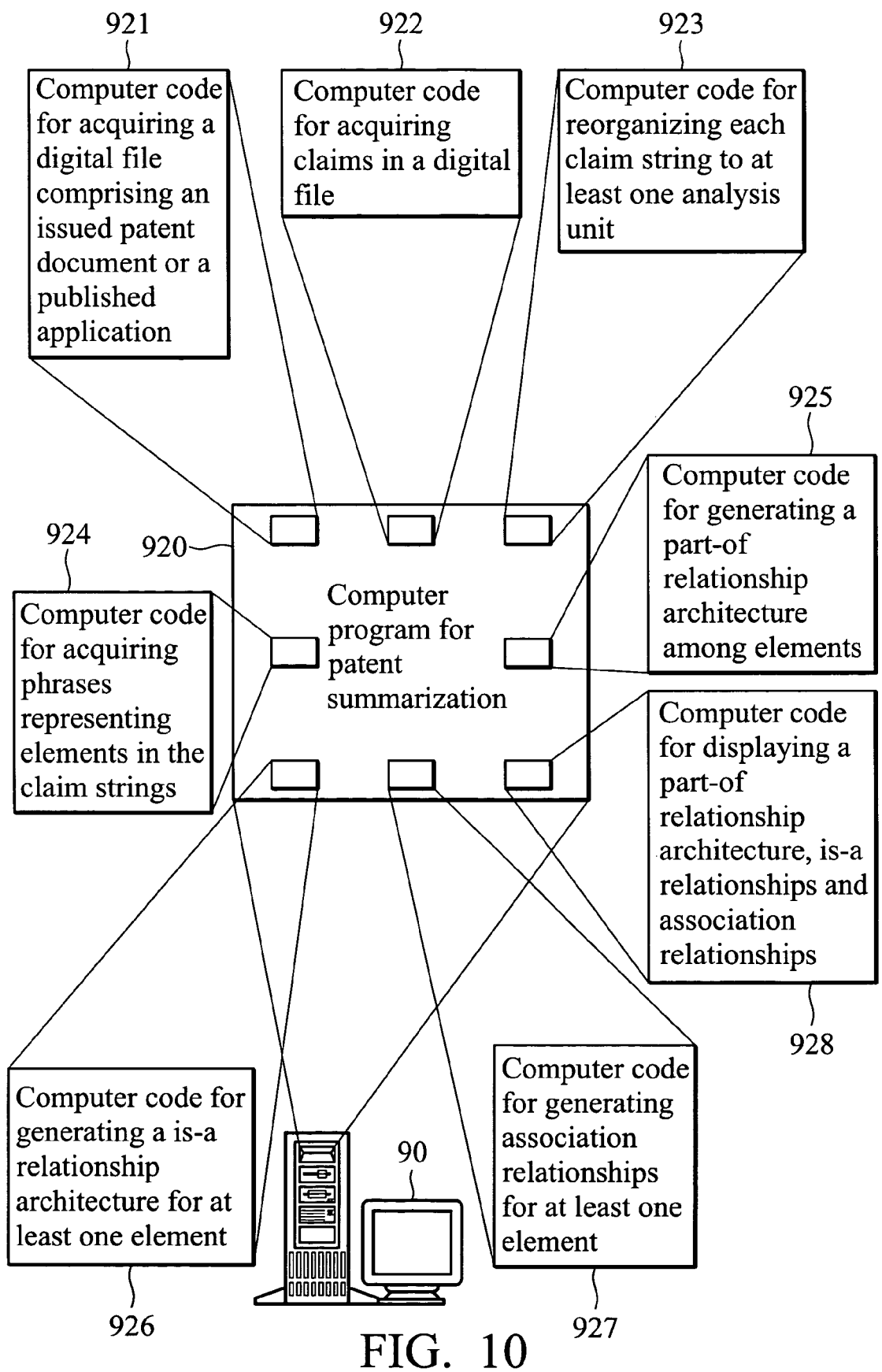
FIG. 10 is a diagram of a storage medium storing a computer program providing an embodiment of a method of patent summarization.

Also disclosed is a storage medium as shown in FIG. 10 storing a computer program 920 providing the disclosed method for patent summarization. The computer program product includes a storage medium 90 having computer readable program code therein for use in a computer system, comprising at least computer readable program code 921 acquiring a digital file comprising an issued patent document or a published application, computer readable program code 922 acquiring claims in a digital file, computer readable program code 923 reorganizing each claim string to at least one analysis unit, computer readable program code 924 acquiring phrases representing elements in the claim strings, computer readable program code 925 generating a part-of relationship architecture for at least two elements, computer readable program code 926 generating a is-a relationship architecture for at least one element, computer readable program code 927 generating association relationships for at least one element, and computer readable program code 928 displaying a part-of relationship architecture for at least two elements, is-a relationships and association relationships for each element.

Patent summarization systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The disclosed methods and systems may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for patent summarization loaded and executed by a processing unit, comprising:
   acquiring a digital file comprising an issued patent document or a published application;
   acquiring at least one claim string from the digital file;
   acquiring a first sub string in the claim string between an indefinite article or a quantifier and a punctuation mark;
   acquiring a second sub string in the claim string between a definite article and a punctuation mark;
   acquiring a plurality of elements from the claim string, wherein the elements are determined by the following step: acquiring maximum matching substrings from the beginning between one of the first substrings and one of the second substrings as the elements;
   generating a part-of relationship architecture among a portion of the elements according to the claim string;
   generating at least one is-a relationship for at least one of the elements according to the claim string;
   generating at least one association relationship for at least one of the elements according to the claim string; and
   displaying the part-of relationship architecture, the is-a relationship and the association relationship.

2. The method of claim 1 wherein the part-of relationship architecture, the is-a relationship and the association relationship are displayed using a tree structure, a data table or a block diagram.

3. The method of claim 1 further comprising:
   reorganizing the claim string to at least one analysis unit in a "Subject-Action-Object" (SAO) structure or a "Subject-Action-Indirect Object-Direct Object" (SAOiOd) structure;
   acquiring the top-level elements in the claim string;
   acquiring an object of the analysis unit as a sub-component for one of the top-level elements if the subject of the analysis unit corresponds to one of the top-level elements and the action of the analysis unit corresponds to part-of relationship semantic; and
   accordingly generating the part-of relationship architecture.

4. The method of claim 1 further comprising:
   reorganizing the claim string to at least one analysis unit in a "Subject-Action-Object" (SAO) structure or a "Subject-Action-Indirect Object-Direct Object" (SAOiOd) structure;
   acquiring an object of the analysis unit as a realistic concept for one of the elements if the subject of the analysis unit corresponds to the detected element and the action of the analysis unit corresponds to is-a relationship semantic; and
   accordingly generating the is-a relationship for the detected element.

5. The method of claim 1 further comprising:
   reorganizing the claim string to at least one analysis unit in a "Subject-Action-Object" (SAO) structure or a "Subject-Action-Indirect Object-Direct Object" (SAOiOd) structure; and
   acquiring the analysis unit as the associated relationship for one of the elements if the subject of the analysis unit corresponds to the detected element and the action of the analysis unit does not correspond to is-a relationship semantic and part-of relationship semantic.

6. A machine-readable storage medium storing a computer program which, when executed, performs a method for patent summarization comprising:
   acquiring a digital file comprising an issued patent document or a published application;
   acquiring at least one claim string from the digital file;
   acquiring a first substring in the claim string between an indefinite article or a quantifier and a punctuation mark;
   acquiring a second sub string in the claim string between a definite article and a punctuation mark;
   acquiring a plurality of elements from the claim string, wherein the elements are determined by the following step: acquiring maximum matching substrings from the beginning between one of the first substrings and one of the second substrings as the elements;
   generating a part-of relationship architecture among a portion of the elements according to the claim string;
   generating at least one is-a relationship for at least one of the elements according to the claim string;
   generating at least one association relationship for at least one of the elements according to the claim string; and
   displaying the part-of relationship architecture, the is-a relationship and the association relationship.

7. A method for patent summarization loaded and executed by a processing unit, comprising:
   acquiring a digital file comprising an issued patent document or a published application;
   acquiring at least one claim string from the digital file;
   acquiring a first substring in the claim string between an indefinite article or a quantifier, and a punctuation mark;
   acquiring a second sub string in the claim string between a definite article and a punctuation mark; and
   acquiring maximum matching substrings from the beginning between one of the first substrings and one of the second substrings as a plurality of elements; and
   acquiring the top-level elements in the claim string;
   acquiring an object of an analysis unit as a sub-component for one of the top-level elements if the subject of the analysis unit corresponds to one of the top-level elements and the action of the analysis unit corresponds to part-of relationship semantic;
   accordingly generating the part-of relationship architecture; and
   displaying the elements and displaying the part-of relationship architecture among a portion of the elements.

8. The method of claim 7 further comprising:
   reorganizing the claim string to at least one analysis unit in a "Subject-Action-Object" (SAO) structure or a "Subject-Action-Indirect Object-Direct Object" (SAOiOd) structure.

9. The method of claim 7 further comprising:
   reorganizing the claim string to at least one analysis unit in a "Subject-Action-Object" (SAO) structure or a "Subject-Action-Indirect Object-Direct Object" (SAOiOd) structure;
   acquiring an object of the analysis unit as a realistic concept for one of the elements if the subject of the analysis unit corresponds to the detected element and the action of the analysis unit corresponds to is-a relationship semantic; and
   accordingly generating the is-a relationship for the detected element; and
   displaying the is-a relationship for the detected element.

10. The method of claim 7 further comprising:
    reorganizing the claim string to at least one analysis unit in a "Subject-Action-Object" (SAO) structure or a "Subject-Action-Indirect Object-Direct Object" (SAOiOd) structure;
    acquiring the analysis unit as the associated relationship for one of the elements if the subject of the analysis unit corresponds to the detected element and the action of the analysis unit does not correspond to is-a relationship semantic and part-of relationship semantic; and
    displaying the association relationship for the detected element.

* * * * *